United States Patent [19]
Cristiani

[11] Patent Number: 5,392,628
[45] Date of Patent: Feb. 28, 1995

[54] PRESS ASSEMBLY FOR EXTRUDING A BILLET

[75] Inventor: Giancarlo Cristiani, Gorizia, Italy

[73] Assignee: Techint-Compagnia Tecnica Internazionale S.p.A., Milan, Italy

[21] Appl. No.: 989,782

[22] Filed: Dec. 10, 1992

[30] Foreign Application Priority Data

Dec. 16, 1991 [IT]  Italy ........................ MI91 A 003365

[51] Int. Cl.$^6$ .......................................... B21C 23/00
[52] U.S. Cl. ........................ 72/253.1; 72/272; 72/38
[58] Field of Search .............. 72/253.1, 270, 272, 72/38

[56] References Cited

U.S. PATENT DOCUMENTS 3,808,865  5/1974  Wagner et al. ...................... 72/38
4,862,721  9/1989  De Rush .............................. 72/263

FOREIGN PATENT DOCUMENTS

0397473  11/1990  European Pat. Off. .
2298379   4/1981  France .
 930984   7/1955  Germany .
2118728  12/1972  Germany .
54-107862  8/1979  Japan .
 107862   8/1979  Japan .
0031986  10/1979  Japan ................................. 72/253.1
 427697   4/1935  United Kingdom .
0699163  10/1953  United Kingdom ................ 72/38
1015185  12/1965  United Kingdom ............. 72/253.1

Primary Examiner—David Jones
Attorney, Agent, or Firm—Young & Thompson

[57]  ABSTRACT

An extrusion press has a sealing and suction device (30; 230; 330) mounted around a plunger (18; 118) with the possibility of sliding axially along the same; the device creates an airtight seal against a back face (25) of a container (20) for a billet (B) when the plunger is working within an inner chamber (24) of the container. A vacuum is created inside the chamber as soon as the plunger enters the chamber before extrusion of the billet begins.

4 Claims, 6 Drawing Sheets

PRESS ASSEMBLY FOR EXTRUDING A BILLET

BACKGROUND OF THE INVENTION

1. Field of the invention

The present invention refers to extrusion presses, particularly but not exclusively presses for the extrusion of metals and more especially for the extrusion of aluminium.

2. Description of the Related Art

These presses traditionally comprise at least an extrusion stem, also known as a pusher or plunger, which is actuated by the cylinder of the press, a container having an inner axial chamber or bore for receiving billets, and an extrusion die downstream of the container. A billet of material to be extruded, carried onto the longitudinal axis of the press by any loading means whatsoever, is loaded into the chamber of the container, which is positioned against the die plate, and then the plunger enters the chamber of the container, applies pressure to the billet and extrudes it through an opening or openings of the die.

The process which has been briefly described above has the drawback that air pockets or blisters often remain trapped in the finished product, with the result that some lengths of a produced section bar may have to be scrapped. These air blisters are due to various causes. In the first place, the inner chamber of the container has a rather wide clearance with respect to the transverse dimension of the billet. In addition, part of the air remains trapped between the irregularities on the surface of the billet. Moreover, air may be trapped between the head of the billet and the die plate if the surfaces in contact are not perfectly smooth and coplanar.

When pressure is applied to the billet by means of the plunger, the billet usually buckles first at the back part (that is the end towards the plunger) until it seals against the walls of the chamber of the container, and therefore it tends to enclose the air inside the chamber, preventing it from escaping to the outside. This entrapment has always been a problem with these types of presses.

Attempts have been made so far to remedy this problem in various ways.

According to one traditional method, the billet is slowly upset until it widens out against the inside surface of the cavity of the container, enclosing a part of the air which is compressed (in practice, pressure is applied to the billet until a preset pressure value is reached); then the pusher and the container make a small move backwards, in such a way that the compressed air flows out towards the atmosphere through the airspace formed between the container and the die; the container is once more brought against the die and the plunger is moved forward until the extrusion of the billet is completed.

This procedure has the advantage of eliminating a great part of the air trapped between the billet and the container; yet it does not succeed in eliminating it completely. In addition, the time required is three or four seconds, which is excessively disadvantageous when it is desired to optimize the whole working cycle of the press; finally, the fact of having to make the machine work in a discontinuous manner subjects the various machine members to additional stress and, in fact, means that the machine members have to be oversized in consideration of this great stress.

Another known system which attempts to avoid the formation of blisters in the finished product consists in pre-heating the billet in a differentiated manner along its length, that is in such a way that the head or front part of the billet, i.e. the end part towards the die, is at a higher temperature than the tail or back end part of the billet, that is the part towards the plunger ("conical heating"). This "conical heating" allows the billet in the container, under the pressure created by the plunger, to widen out until it abuts the wall of the container, first at the front part and then gradually along its body as far as the back part. This system allows the air which is between the sides of the billet and the container wall to be expelled; however, it does not expel any air which may be enclosed between the head of the billet and the die. In addition, the installation costs for this process are high.

The use is also known of a combination of the two systems described above.

In a recently published European patent application Ser. No. 397,473, a container chamber is depressurized before beginning extrusion, through a suction opening in the plunger, said opening being connected, by means of a channel extending axially in the plunger, to a vacuum chamber or apparatus for creating a vacuum. In particular, the publication describes a plunger provided with a pressure pad on the plunger foot, this pad being carried in a mobile way on the end of the foot, in such a way that it leaves between the pad, when it is in the extended position, and the foot, a passage which communicates with an axial channel, said passage closing when the pad is pressed against the foot of the plunger during the thrust on the billet.

One drawback with this system lies in the fact that the plunger with a pad is expensive to produce; in addition, it is well known that the entire end part of the plunger, called the foot, is subject to wear and has to be replaced relatively often; the frequent replacement of the foot with a pad therefore makes this equipment expensive to run.

Yet again, since the suction is carried out without there being any effective seal between the plunger and the inside wall of the container, it is easy for the outside air to seep in around the foot of the plunger, making the vacuum in the container less efficient. Finally, suction ceases the moment when the force exercised between the plunger and the billet becomes greater than the force of the spring which moves the pad away from the foot of the plunger, and therefore in these conditions the pad returns to its housing on the plunger, closing the annular suction opening.

SUMMARY OF THE INVENTION

The aim of this invention is to eliminate the drawbacks of previous systems, and in particular to provide an apparatus capable of eliminating easily air from the container. A further aim is to realize an apparatus which may be produced and operated at relatively low costs, and which is capable of maintaining a vacuum for a sufficiently long time.

These aims have been achieved by means of a press assembly for the extrusion of metals, particularly aluminum.

In particular a press has been invented which comprises a sealing device around the plunger which makes a seal both around the plunger (and yet at the same time allows it to slide longitudinally) and against a wall, usually the back wall, of the container. One or two suction ducts pass through the sealing device.

A sealing device is pushed against the wall of the container by means which comprise preferably at least a spring.

The invention can be produced at moderate cost; it allows the normal replacement of the plunger foot at normal cost and at normal intervals; it allows a degree of vacuum to be produced inside the container before extrusion is begun, in particular before the billet is upset against the wall of the container chamber, without air seeping in from the outside and without taking up additional time, thus achieving greater efficiency with respect to previous processes. In addition, the invention can easily be applied to side loading presses, with a plunger shiftable in a rotating movement, as disclosed in a recent patent application of the same applicant.

BRIEF DESCRIPTION OF THE DRAWINGS

Exemplary unrestrictive embodiments of the invention are described below with reference to the appended drawings, in which.

DETAILED DESCRIPTION OF THE EMBODIMENTS

Figure 1:
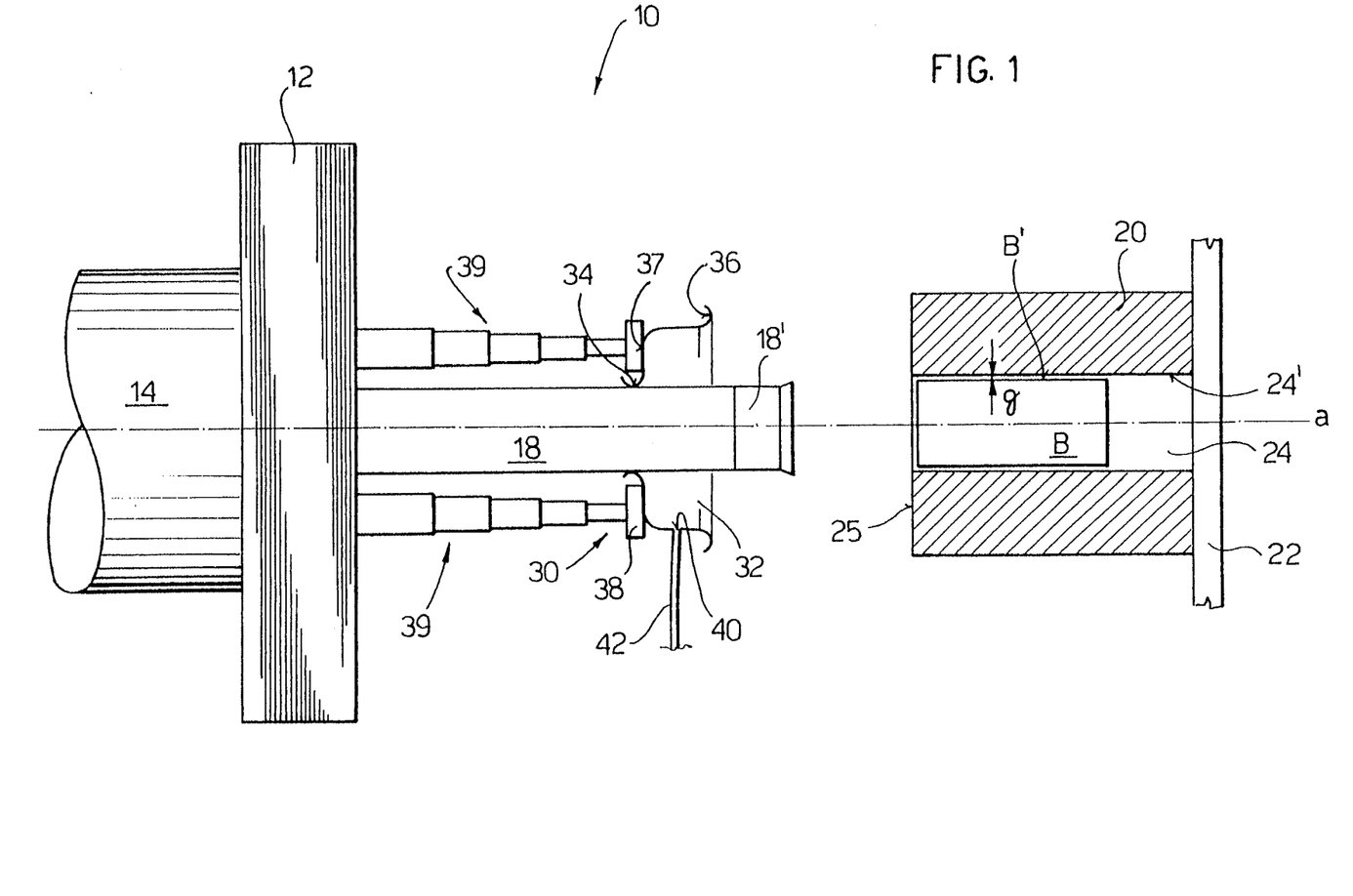
FIG. 1 is a part sectional, diagrammatic, broken off plan view of a first example of a press unit according to the present invention, shown at a position before beginning extrusion, with the plunger in a retracted position.
Figure 2:
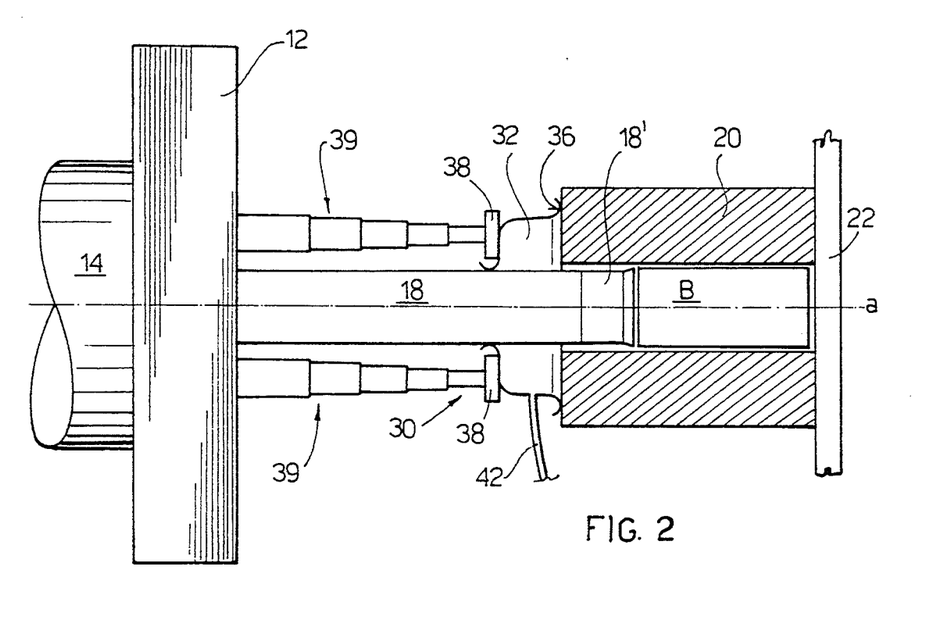
FIG. 2 is a view similar to that in FIG. 1, at the beginning of extrusion.
Figure 3:
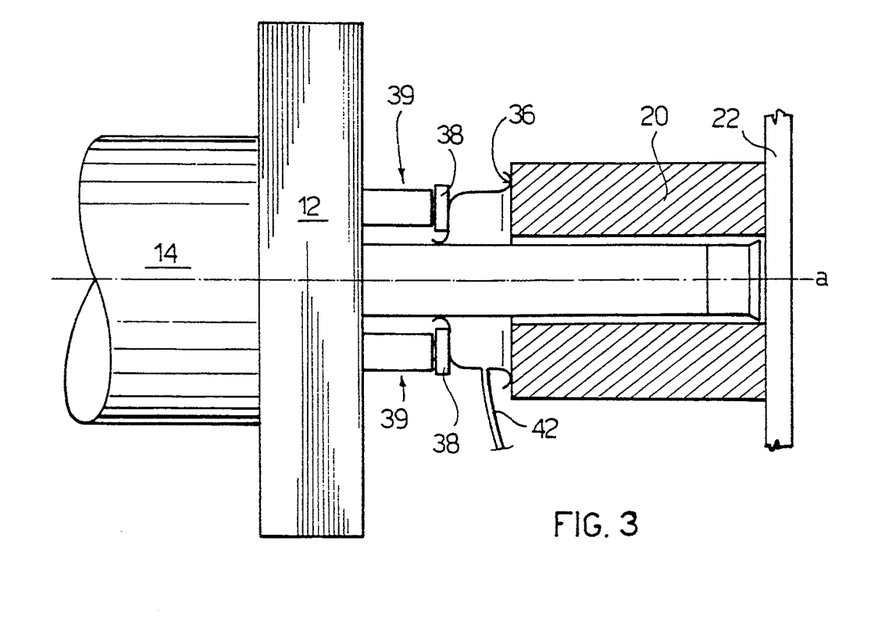
FIG. 3 shows the press in FIG. 1 at the end of extrusion.

With reference to the FIG. 1, number 10 is an extrusion press, 12 is a movable cross member thereof, 14 is the driving cylinder of the press, 18 is the plunger, integral with the cross member, and 18' is the foot of the plunger which is of a per se known type. Reference number 20 indicates a container for a billet B and 22 is an extrusion die plate (the holes of which are not shown).

A billet B, carried on the longitudinal axis a of the press in any known way, is introduced into the inner chamber 24 of the container 20 by per se known means; between the side wall 24' of the chamber of the container and the side surface B' of the billet, there is a clearance g. With the container abutting against the die plate 22, the plunger 18 enters the chamber 24 and applies pressure to the billet, first causing it to upset against the wall of the chamber, and then causing it to be extruded across the die plate 22.

According to the invention, a sealing and suction device, shown as a whole with the number 30, is carried around the plunger 18 and is movable longitudinally for a length along the axis a, together with the plunger and/or along it, for a short length at least. This device, in the embodiment in the FIGS. 1 to 4, comprises a bell or skirt 32 made of relatively flexible and elastic sheet metal, having a rounded rim, or a sharp edge 34 or other means for sealing against the plunger, and a further rounded rim 36, or sharp edge or other means for sealing against a wall of the container, usually the back face 25 of the container, which is transverse to the axis a. The wall of the bell or skirt forms at least two relatively flat surface seats 37, positioned traversely to the axis a, to act as supports for the heads 38—38 of the respective thrust rod members 3—39 which, in the FIGS. 1-6 are shown in diagrammatic form as telescopic rods or stems. Preferably the surface seat 37 will be annular and the number of the heads 38 will vary, and they will be spaced out along a circumference in a regular manner. The members 39 are carried by the movable cross member 12 of the press and are preferably formed by elastic thrust rods or comprise an elastic means. Through a hole 40 the wall of the skirt 32 carries a duct 42 connected to a device for creating a vacuum or to a vacuum chamber, which, since they are known in themselves, are not described in greater detail.

When the billet has been loaded into the container 20, which is in contact with the die plate 22, the cross member 12 is moved to carry the plunger 18 near to and inside the chamber 24. The movement of the cross member 12 at the same time moves the skirt 32 near and abuts it against the back face 25 of the container. The rod member 39 push the rim 36 of the skirt 32 against the face 25 and apply pressure onto it for sealing it against the back face 25; the sealing pressure of the sharp edge 34 against the plunger 18 at the same time increases, due to the shape of the skirt.

In due time, that is before the plunger 18 upsets the billets B against the side wall 24 of the container 20, vacuum is applied by means of the duct 42. This action sucks up air trapped between the head of the billet B and the die plate 22; between the side surface B' of the billet B and the side wall 24' of the chamber 24; between the back part of the billet B and the plunger 18; and within the skirt 32 itself. The plunger 18 then is able to continue its work, sliding along the sealing and suction device 30, in such a way as to upset the billet B (which will therefore not trap air or only a minimal amount) and to extrude it across the die plate 22; in the meantime the rod members 39 contract.

The return movement of the plunger 18 draws the bell or skirt 32 with it.

The new device, as well as being able to be realized on new manufactured presses, can also be adapted on already existing presses. In addition, it is particularly suitable for being mounted on presses according to an Italian patent application made by the same applicant, as illustrated in the figures a and 5. The press 100 in FIG. 4 comprises, on a movable cross member 112, a rotationally shiftable billet loading device, which comprises an arm 115 hinged to the cross member 112 and rotating around the axis b, which is parallel to the axis a mentioned above. The arm 115 carries a loader (not shown) and a plunger 118, which, for carrying out its extrusion function, rests in a suitable housing 116 on the cross member. The remaining parts of the apparatus, being identical with the parts of the apparatus illustrated in FIGS. 1 and 2, have the same reference numbers, and therefore they will not be described in detail.

Figure 4:
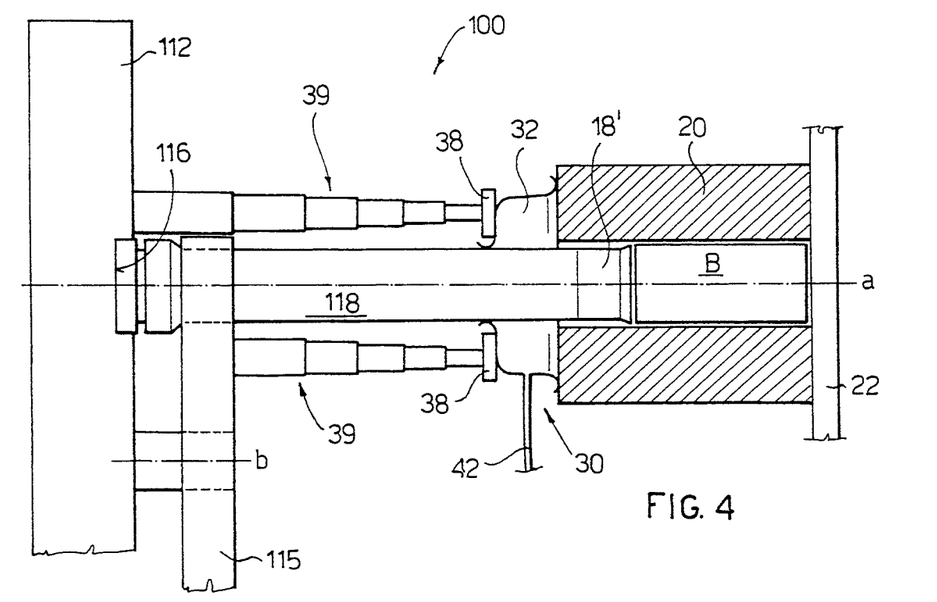
FIG. 4 is a part sectional, diagrammatic plan view of a different type of press, which comprises a device similar to the one illustrated in FIG. 1; the press is shown in a condition at the beginning of extrusion.

In this case, the two rod members 39 are carried respectively on the movable cross member 112 and on the arm 115.

Figure 5:
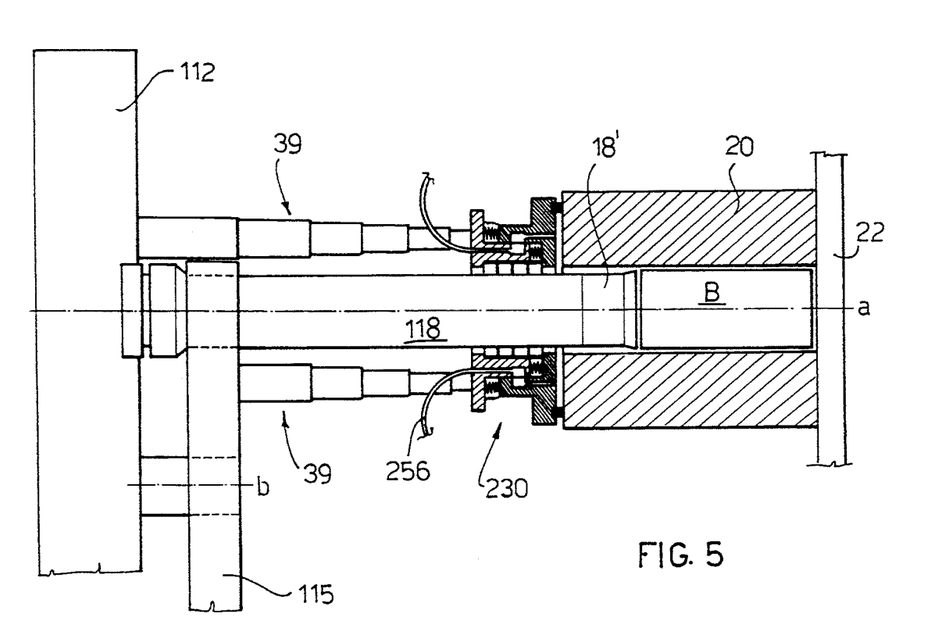
FIG. 5 is a part sectional, diagrammatic plan view along a press similar to the one in FIG. 4 but incorporating a different type of device, in the condition at the beginning of extrusion.
Figure 6:
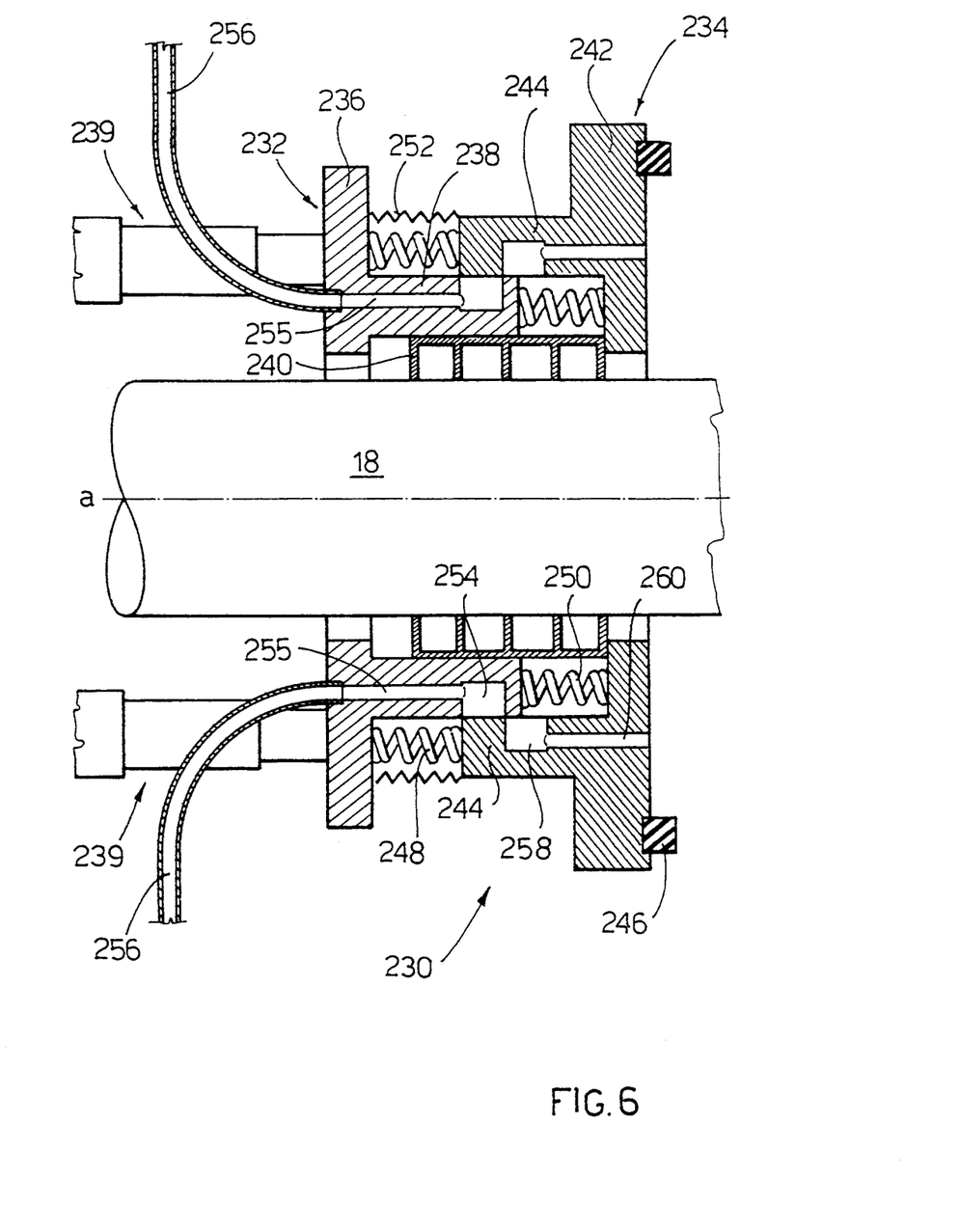
FIG. 6 shows the closing device in FIG. 5, at a condition not subject to pressure, and enlarged with respect to the previous figure.

A modified embodiment of the device is illustrated in FIGS. 5 and 6, on a press similar to the one in FIG. 4 (hence having the same reference numbers and therefore not described in detail).

In this case the sealing and suction device, indicated as a whole with number 220, comprises two sleeve parts or annular elements 232 and 234 sliding axially over a common length.

In particular, the sleeve part or annular element 232 has an end flange 236, connected to spring or fluid driven telescopic rods 239, and a cylindrical extension 238; between the latter and the plunger 18, a gasket 240 is interposed which, however, does allow a limited amount of reciprocal axial sliding of the annular element 232 and the plunger 18. The annular element 234 comprises an end flange 242 and a cylindrical extension 244; the flange 242 carries sealing rings 246 in its face which is turned toward the container. The elements 232 and 234 are fastened together in any known way, which is not shown. Two series of pressure springs 248 and 250 of any known type are interposed between the elements 232 and 234 in such a way that they are urged away from each other axially.

The chamber which houses the springs 248 is screened towards the outside by a cylindrical bellows 252 or the like.

The element 232 comprises a circumferential channel 254 open along an external band, to which an axial passage 255 is in communication with a duct 256.

The element 234 is formed with a circumferential channel 258 open along an inner circumferential band, to which at least one axial passage 260 is communicated.

In FIG. 5, the condition is illustrated where the rod members 39, formed by pressure springs or by fluid cylinders, press the device 230 against the back face of the container 20. In this condition, the circumferential channels 254 and 258 shown in FIG. 6 are facing each other and in communication, in such a way that the passage of air is allowed from the inner chamber of the container 20 to the passage 260, to the channels 254 and 258, and out to the passage 255. When the device 230 is not pushed against the container (FIG. 6), the elements 232 and 234 are staggered between each other, until they close the communication between the channels 254 and 258.

Figure 7:
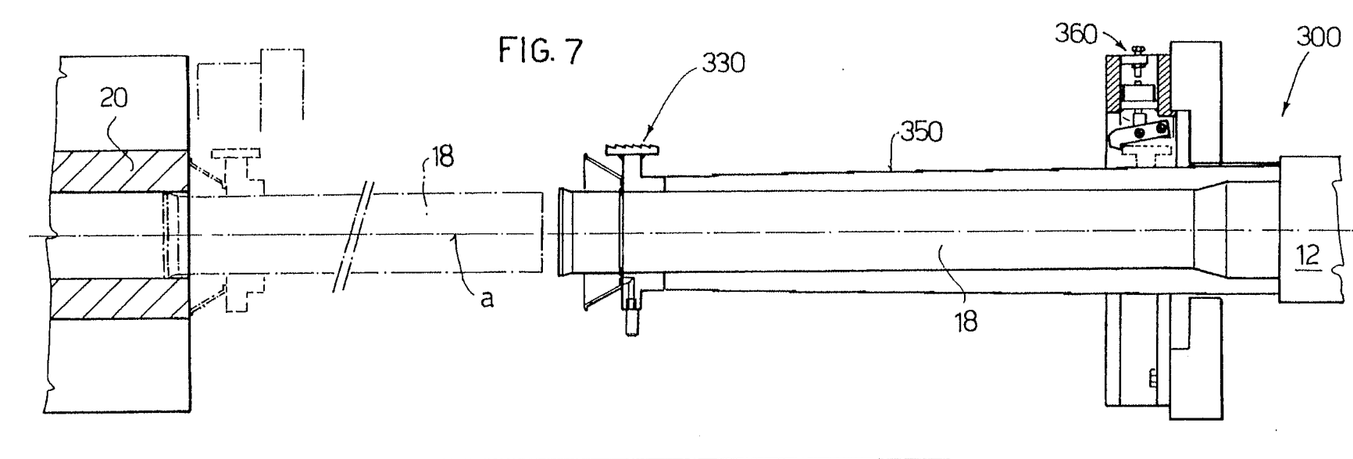
FIG. 7 is a part sectional interrupted plan view taken along the axis of the press, of a further embodiment of the press assembly; the plunger is drawn with a continuous line in the retracted position (the billet has entered the plant) and in section line in the extended condition at the beginning of the extrusion; the section is carried out along two diametric planes which are at an angle with each other.
Figure 8:
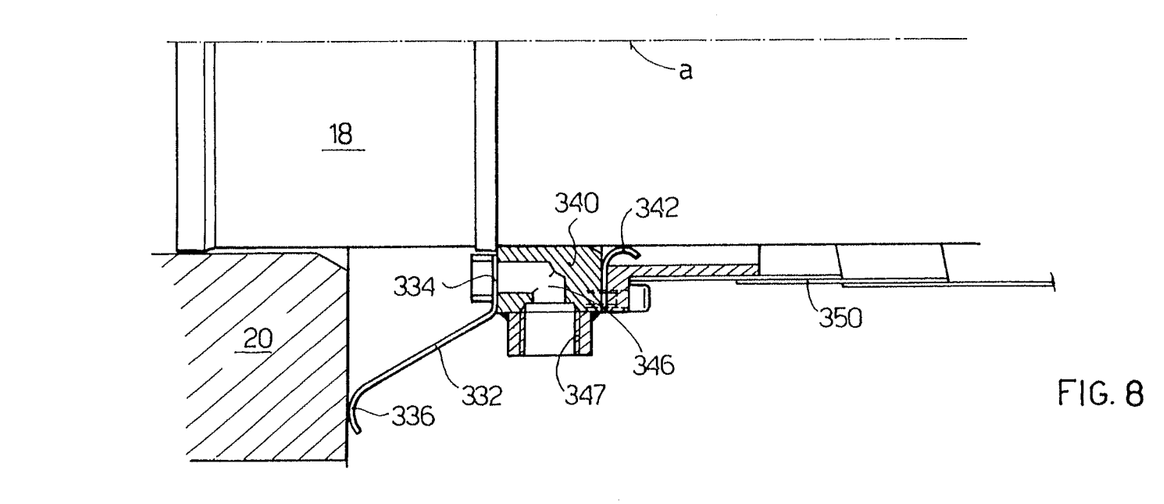
FIG. 8 is an enlarged detail of FIG. 7 (the plunger is at the beginning of the extrusion)
Figure 9:
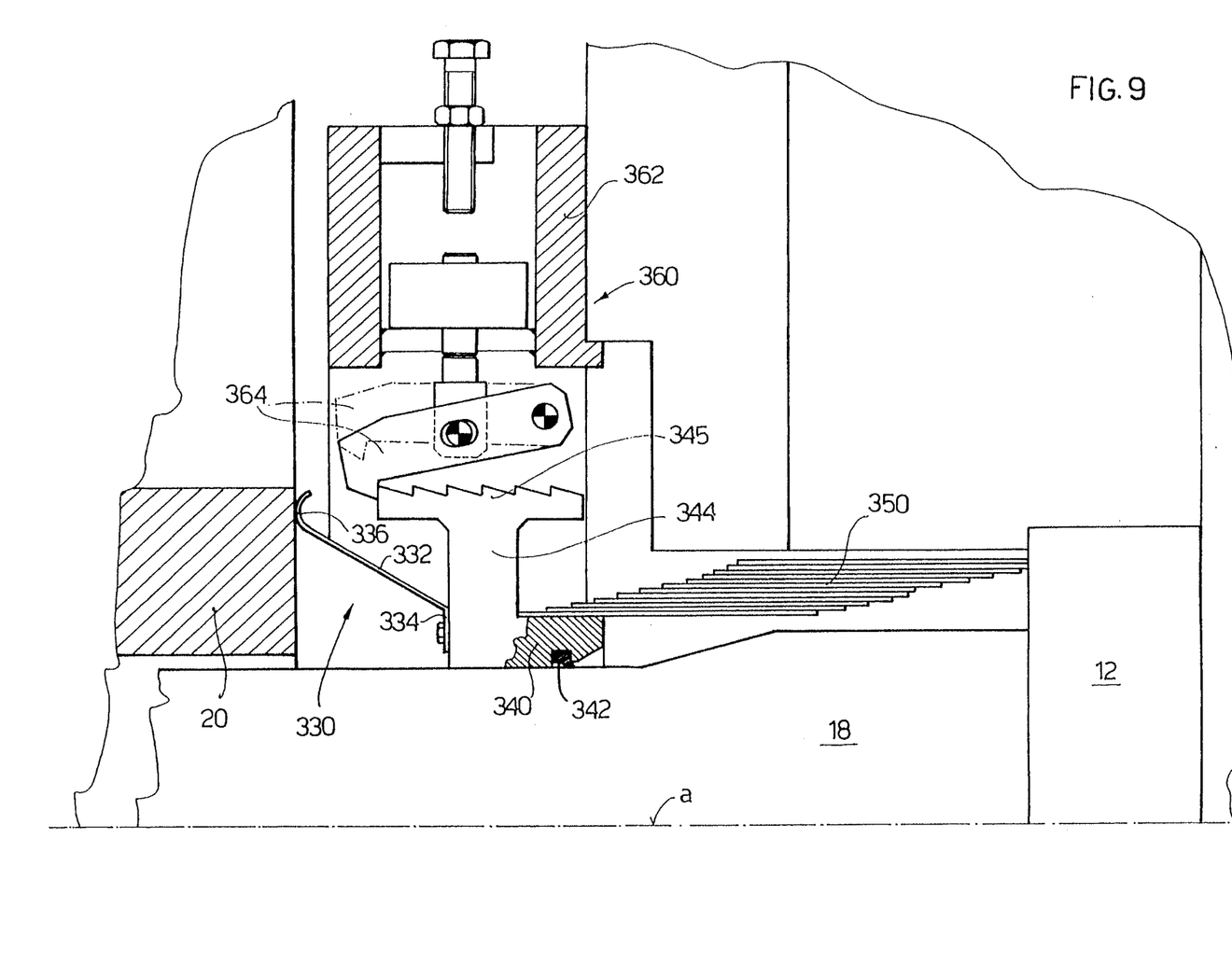
FIG. 9 is an axial sectional view of a detail of the assembly in the condition when the plunger is extended at the end of the extrusion stroke.

In the embodiment shown in FIGS. 7–9, the elements similar to those of the other embodiments have the same reference numbers and will not be described in detail; the cross member 12 of the press 300 in FIG. 7 thus carries a plunger 18 cooperating with a container 20. A sealing and suction device 330 comprises in FIG. 8 a substantially frustoconical skirt wall 332, provided with a rounded lip 336 at the major base for sealing support on the back face of the container 20. A rim 334 of the skirt wall 332, extended towards the inside from its minor base, is fastened to a sliding collar 340, which slides longitudinally along the plunger 18 and is sealed on it by means of an annular gasket 342 in a shape that is whatsoever suitable; just for an example, the gasket 342 has been drawn as a rounded sheet in FIG. 8 and as an elastomer ring received in an annular ring 340 in FIG. 9. The ring 340 has two or more radial arms 344, preferably equally angularly spaced, provided with distal engagement teeth 345. Furthermore, the ring 340 has, preferably in correspondence with a radius thereof angularly staggered with respect to the above radial arms 344, a communication passage 346, shown only in FIG. 8, between an inner room defined by the skirt wall 332 and the outside; in particular the threaded mouth 347 of the passage 346 will be connected to a suction means (not shown). The sliding collar 340 is pressed in an extended position along the plunger 18 by a pushing means formed by a thrust spring 350. This spring 350 is preferably formed by a helical winding of steel strip or similar metal having the extrusion axis a of the press as a longitudinal axis. One end of the spring 350 is engaged to the collar 340 and the other end is engaged to the cross member 12 in FIG. 7 or to a plunger holder arm 115 as in FIG. 4.

To move the skirt wall 332 in FIG. 9 away from the container 20, the cross member 12 carries a coupler device 360 substantially comprising, on a frame 362 fastened to the cross member 12, an oscillating hook 364, in correspondence with each one of the several engaging teeth 345. The hook 364 oscillates between a first position in which it is engaged with the teeth 345 and a second position in which it is disengaged from them, both positions can be obtained in whatsoever way within the reach of a technician skilled in the art.

More specifically, to degas the chamber of the container 20, the skirt wall 332, free from the hooks 364, is pushed by the thrust spring 350 against the container 20 and the vacuum plant (not shown) sucks air from it.

At the end of an extrusion stroke of the plunger 18, the frame 362 reaches the ring 340, engages the teeth 345 and moves the skirt wall 332 away from the container 20 at the time when the same plunger 18 is drawn out.

I claim:

1. A press assembly (10; 100; 300) for extruding a billet (B) along a longitudinal axis (a), comprising:
    a cross member (12; 112) movable along the longitudinal axis;
    a plunger (18; 118) movable with the cross member;
    a container (20) having a back face (25) and an inner chamber (24) aligned with the longitudinal axis for receiving the billet to be extruded;
    a sealing and suction device (30; 230; 330) arranged around the plunger, said device including
        first means (34; 240; 342) for sealing a space containing air against the plunger;
        second means (36; 246; 336) for sealing the space against the back face of the container;
        an elastic skirt wall means (32; 232, 234; 332) for connecting the first sealing means with the second sealing means;
        passage means (42; 256; 346) for allowing suction of the air from said space; and
        elastic means (39; 239; 350) for pushing the sealing and suction device against the back face of the container;
    wherein said elastic pushing means is a thrust spring (350) formed by a helical winding of a metal strip surrounding the longitudinal axis.

2. A press assembly according to claim 1, wherein:

said sealing and suction device further includes ring means (340 in FIG. 9) for connecting the thrust spring with the first sealing means.

3. A press assembly (10; 100; 300) for extruding a billet (B) along a longitudinal axis (a), comprising:
   a cross member (12; 112) movable along the longitudinal axis;
   a plunger (18; 118) movable with the cross member;
   a container (20) having a back face (25) and an inner chamber (24) aligned with the longitudinal axis for receiving the billet to be extruded; and
   a sealing and suction device (30; 230; 330) arranged around the plunger, said device including
      first means (34; 240; 342) for sealing a space containing air against the plunger;
      second means (36; 246; 336) for sealing the space against the back face of the container;
      an elastic skirt wall means (32; 232, 234; 332) for connecting the first sealing means with the second sealing means;
      passage means.(42; 256; 346) for allowing suction of the air from said space; and
      a pair of first and second annular elements (232, 234) sliding on each other axially.

4. A press assembly according to claim 3, wherein:
said first annular element (232) carries the first sealing means (240); and
said second annular element (234) carries the second sealing means (246).

* * * * *